United States Patent
Krystek et al.

(10) Patent No.: US 11,237,565 B2
(45) Date of Patent: Feb. 1, 2022

(54) OPTIMAL DRIVING CHARACTERISTIC ADJUSTMENT FOR AUTONOMOUS VEHICLES

(71) Applicant: INTERNATIONAL BUSINESS MACHINES CORPORATION, Armonk, NY (US)

(72) Inventors: Paul Krystek, Highland, NY (US); Shikhar Kwatra, Durham, NC (US); John Wilson, League City, TX (US); Bryan Baysinger, Atlanta, GA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 153 days.

(21) Appl. No.: 16/239,246

(22) Filed: Jan. 3, 2019

(65) Prior Publication Data

US 2020/0218271 A1 Jul. 9, 2020

(51) Int. Cl.
| | | |
|---|---|---|
| G05D 1/02 | (2020.01) | |
| G05D 1/00 | (2006.01) | |
| G06N 20/00 | (2019.01) | |
| G06F 16/28 | (2019.01) | |

(52) U.S. Cl.
CPC ......... *G05D 1/0221* (2013.01); *G05D 1/0088* (2013.01); *G06F 16/285* (2019.01); *G06N 20/00* (2019.01)

(58) Field of Classification Search
CPC .............................. B60W 40/09; B60W 40/10
See application file for complete search history.

(56) References Cited

U.S. PATENT DOCUMENTS

| | | | |
|---|---|---|---|
| 8,428,843 | B2 | 4/2013 | Lee et al. |
| 9,132,839 | B1 | 9/2015 | Tan |
| 9,326,087 | B2 | 4/2016 | Valeri et al. |
| 2017/0068245 | A1 | 3/2017 | Scofield et al. |
| 2017/0274908 | A1 | 9/2017 | Huai |
| 2018/0041583 | A1 | 2/2018 | Fan et al. |
| 2018/0194366 | A1* | 7/2018 | Krishnan ............ B60W 50/087 |
| 2020/0079385 | A1* | 3/2020 | Beaurepaire ...... B60W 60/0013 |
| 2020/0189568 | A1* | 6/2020 | Pan .................. B60W 50/0098 |

OTHER PUBLICATIONS

"Method to Provide a Human-Vehicle Interaction Cognitive Service to Improve Ride Experience for Self-Driving Vehicles" An IP.com Prior Art Database Technical Disclosure at:https://ip.com/IPCOM/000252963 Authors et al.: Disclosed Anonymously IP.com No. IPCOM000252963D IP.com Electronic Publication Date: Feb. 24, 2018 (5 Pages).

* cited by examiner

*Primary Examiner* — Imran K Mustafa
(74) *Attorney, Agent, or Firm* — Griffiths & Seaton PLLC

(57) ABSTRACT

Embodiments for implementing intelligent driving comfort adjustment of an autonomous vehicle by a processor. A user experience satisfaction level may be determined during a journey within an autonomous vehicle according to historical user experience satisfaction levels, a user profile, one or more contextual factors, or a combination thereof. One or more performance characteristics of the autonomous vehicle may be adjusted if a user experience satisfaction level is less than a predetermined threshold.

20 Claims, 7 Drawing Sheets

OPTIMAL DRIVING CHARACTERISTIC ADJUSTMENT FOR AUTONOMOUS VEHICLES

BACKGROUND OF THE INVENTION

Field of the Invention

The present invention relates in general to computing systems, and more particularly to, various embodiments for optimal driving characteristic adjustment for autonomous vehicles of a vehicle by a processor.

Description of the Related Art

Vehicles of every kind, size, and energy consumption are prevalent in every aspect of today's society, as people are more mobile today than likely at any time in recorded history. Autonomous vehicles are quickly growing in popularity and will become the majority of vehicles on the road at some point in the future. Autonomous vehicles are vehicles that are able to autonomously drive themselves through private and/or public spaces. Using a system of sensors that detect the location and/or surroundings of the autonomous vehicles, logic within or associated with the autonomous vehicles controls the propulsion, stopping, and steering of the autonomous vehicles based on the sensor-detected location and surroundings of the autonomous vehicles.

SUMMARY OF THE INVENTION

Various embodiments for implementing intelligent driving characteristic adjustment for autonomous vehicles by a processor, are provided. In one embodiment, by way of example only, a method for implementing intelligent driving characteristic adjustment for autonomous vehicles by a processor is provided. A user experience satisfaction level may be determined during a journey within an autonomous vehicle according to historical user experience satisfaction levels, a user profile, one or more contextual factors, or a combination thereof. One or more performance characteristics of an autonomous vehicle may be adjusted if a user experience satisfaction level is less than a predetermined threshold.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
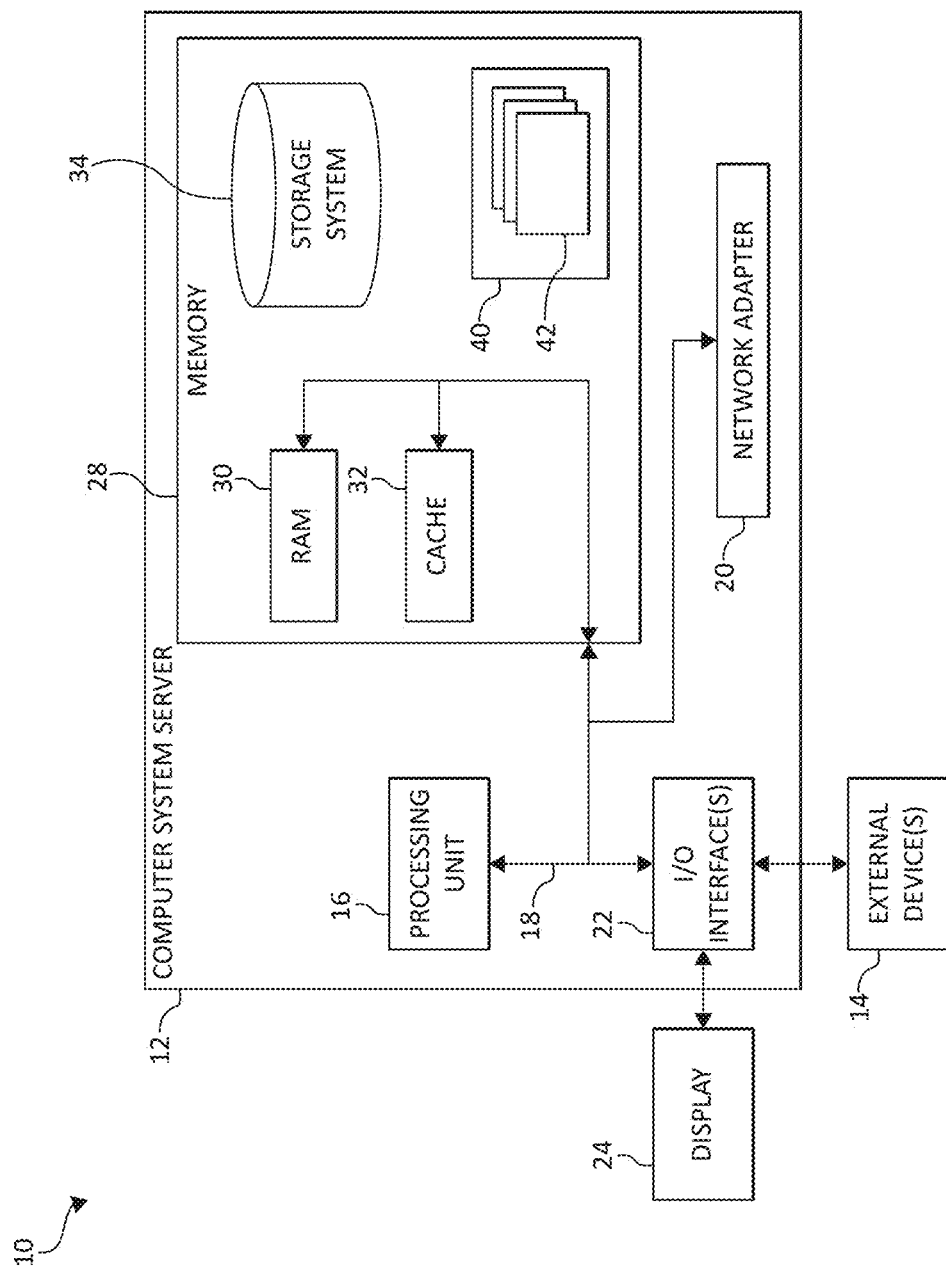
FIG. 1 is a block diagram depicting an exemplary computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, in both private and public transportation (e.g., driving, flying, etc.) such as, for example, transportation in the form of passenger carrying pods or unmanned aerial vehicles ("UAVs")/unmanned aircraft system ("UAS"), passengers have very little influence over the driving/travel characteristics (e.g., flight characteristics). As such, there is a need to include personal comfort levels of occupants in a vehicle (e.g., passengers in a plane) that automatically influence the driving/travel characteristics to adapt to the passenger's real-time cognitive state.

It should be noted that as used herein, "vehicle" may include automobiles (e.g., car, sport utility vehicle "SUV", trucks, etc.), off-road vehicles (e.g., all-terrain vehicles "ATV") bicycles, motorcycles, trains, subways, ships, boat, aircrafts, watercrafts, sailcrafts, hovercrafts, golf carts, drones and/or other types of transportation or movable objects. In an additional aspect, vehicle may include one or more types of transportation or movable objects that require a license and/or registration (e.g., a driver's license issued by a governmental or regulatory agency) in order to operate and move about a roadway, highway, railways, and/or other means for operating the one or more types of transportation or movable objects. Moreover, the vehicles may be autonomous vehicles (e.g., self-driving vehicles "SDVs"), UAVs, and/or UASs. The autonomous vehicles may have built-in autopilot and navigation systems. In an additional aspect, the autonomous vehicles may provide various modes/means of transportation and may seamlessly transition from one mode/mean of transportation to another. For example, an autonomous vehicles may be both an automobile having driving characteristics and a passenger carrying pod/drone (e.g., UAV) and may include flying characteristics and may interchange between the driving characteristics and the flying characteristics.

In an additional aspect, the present invention provides for implementing intelligent driving characteristic adjustment for autonomous vehicles. A user experience satisfaction level may be determined during a journey within an autonomous vehicle according to historical user experience satisfaction levels, a user profile, one or more contextual factors, or a combination thereof. One or more performance characteristics of an autonomous vehicle may be adjusted if a user experience satisfaction level is less than a predetermined threshold.

Also, the mechanisms of the present invention provide a cognitive system for optimal and/or appropriate driving/travel characteristic adjustment for autonomous vehicles. A UAV with passengers may adapt/adjust one or more flying parameters, comfort characteristics, and safety features based on detected passenger's physical and emotional state. The operation of adapting/adjusting to the passenger's comfort level involves cognitively understanding the user and deducing various risk thresholds for the user based on 1) ranking the passenger's cognitive heuristics and/or 2) prioritizing the actions to be taken by the passenger carrying UAV.

The so-called "optimal" or "appropriateness" of an appropriate level of comfort for a passenger may be subjective and context dependent. For example, one solution for providing passenger comfort within an autonomous vehicle may be interpreted and evaluated to be either satisfactory or unsatisfactory depending on the user preferences, contextual information, an emotional state, and/or historical user experiences. Accordingly, the so-called "appropriateness" of performance requirements may depend greatly upon contextual factors. A deeper, cognitive analysis of the user may be provided to further understand the user and/or interpret the appropriateness of a given context.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter may communicate with a hub server or a cloud via wireless, optical fibre, or copper fibre. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
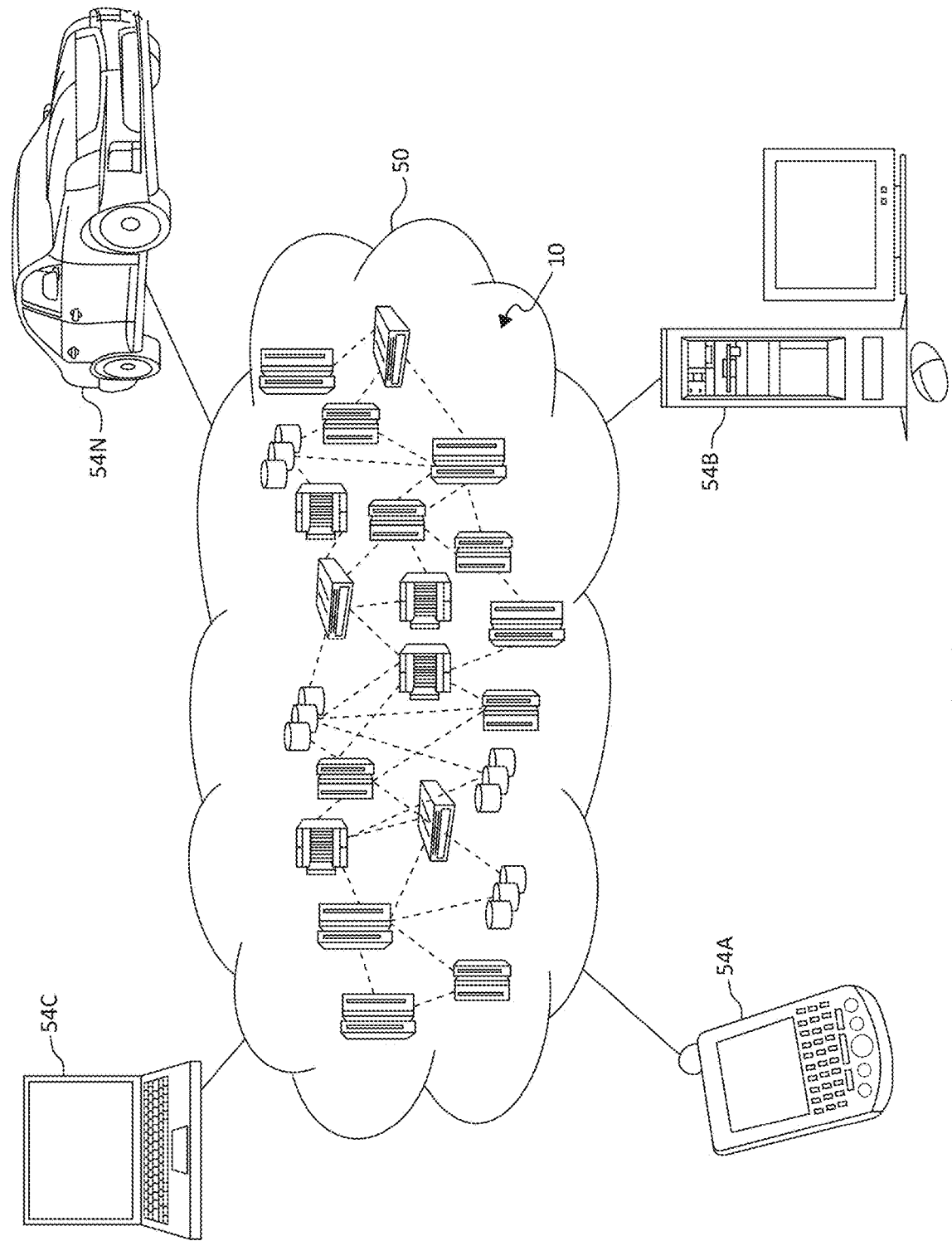
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser provided by a service provider).

Figure 3:
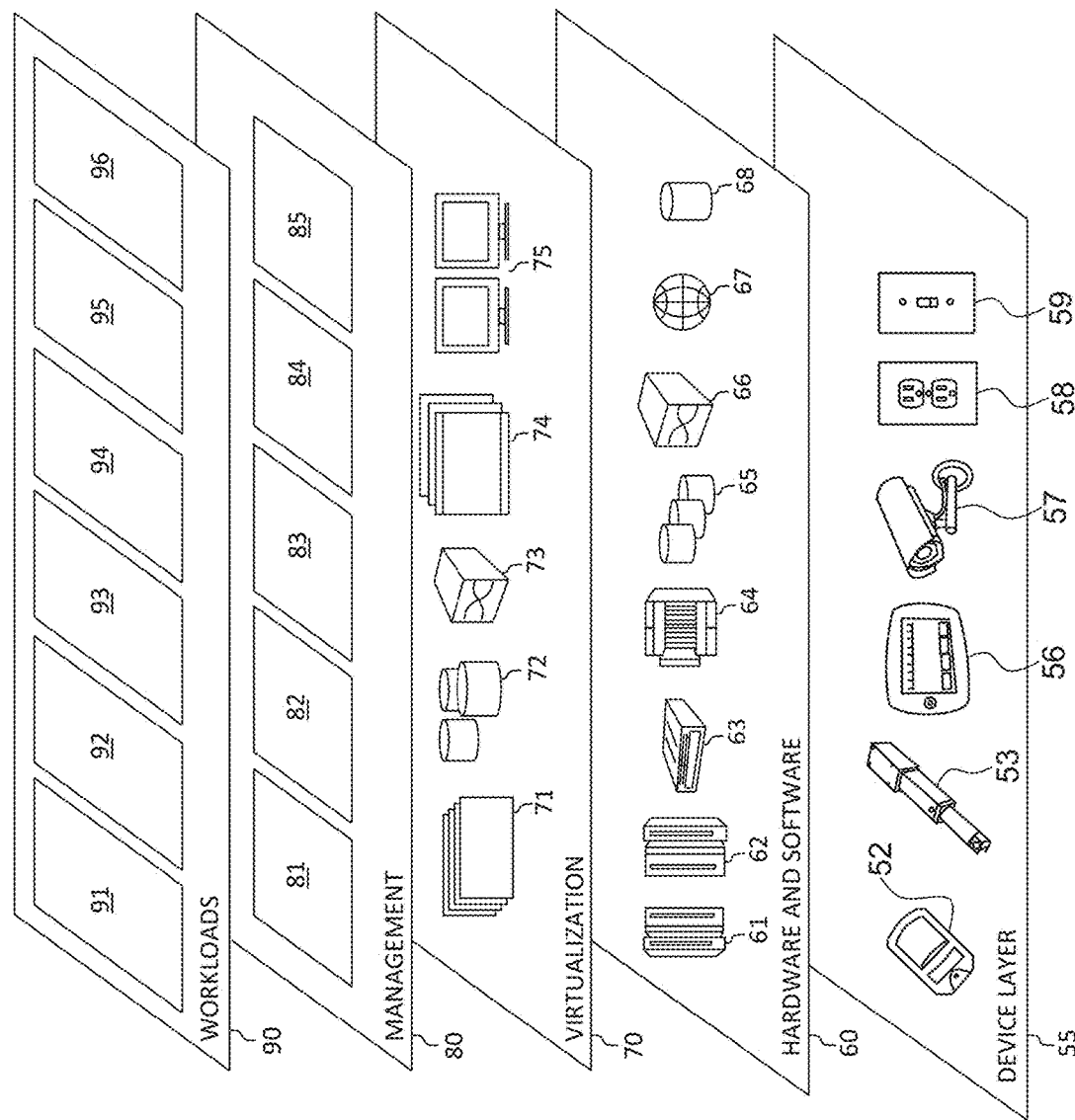
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "Internet of Things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components.

Examples of hardware components include: mainframes 61; RISC (Reduced Instruction Set Computer) architecture, such as PowerPC, based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent driving characteristic adjustment for autonomous vehicles. In addition, workloads and functions 96 for intelligent driving characteristic adjustment for autonomous vehicles may include such operations as data analysis (including data collection and processing from various environmental sensors), collaborative data analysis, and predictive data analytics functions. One of ordinary skill in the art will appreciate that the intelligent driving characteristic adjustment for autonomous vehicles workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for an intelligent driving/travel comfort adjustment of an autonomous vehicle by a processor. A user experience satisfaction level may be determined during a journey within an autonomous vehicle according to historical user experience satisfaction levels, a user profile, one or more contextual factors, or a combination thereof. One or more performance characteristics of the autonomous vehicle may be adjusted if a user experience satisfaction level is less than a predetermined threshold. User data relating to the historical user experience satisfaction levels, the user profile, and the one or more contextual factors may be collected. The historical user experience satisfaction levels, the one or more user profiles, one or more contextual factors, or a combination thereof may be clustered into a cluster of users for the one or more users and determine a risk threshold for the cluster of users and use reinforcement learning to dynamically adjust the parameters based on a global satisfaction level of the cluster of users.

Said differently, one or more performance characteristics of an autonomous vehicle may be adjusted for a plurality of users based on learning their respective comfort/satisfaction level and profiles. The different user profiles (which may include the historical data/satisfaction levels, learned data for the user, user preferences, user profiles, etc.) may be clustered together. A risk threshold for the cluster of user profiles may be determined using a reinforcement learning operation in order to dynamically adjust the parameters based on averaging the different, learned satisfaction/comfort levels of each user to reach a global optimum satisfaction level.

Figure 4:
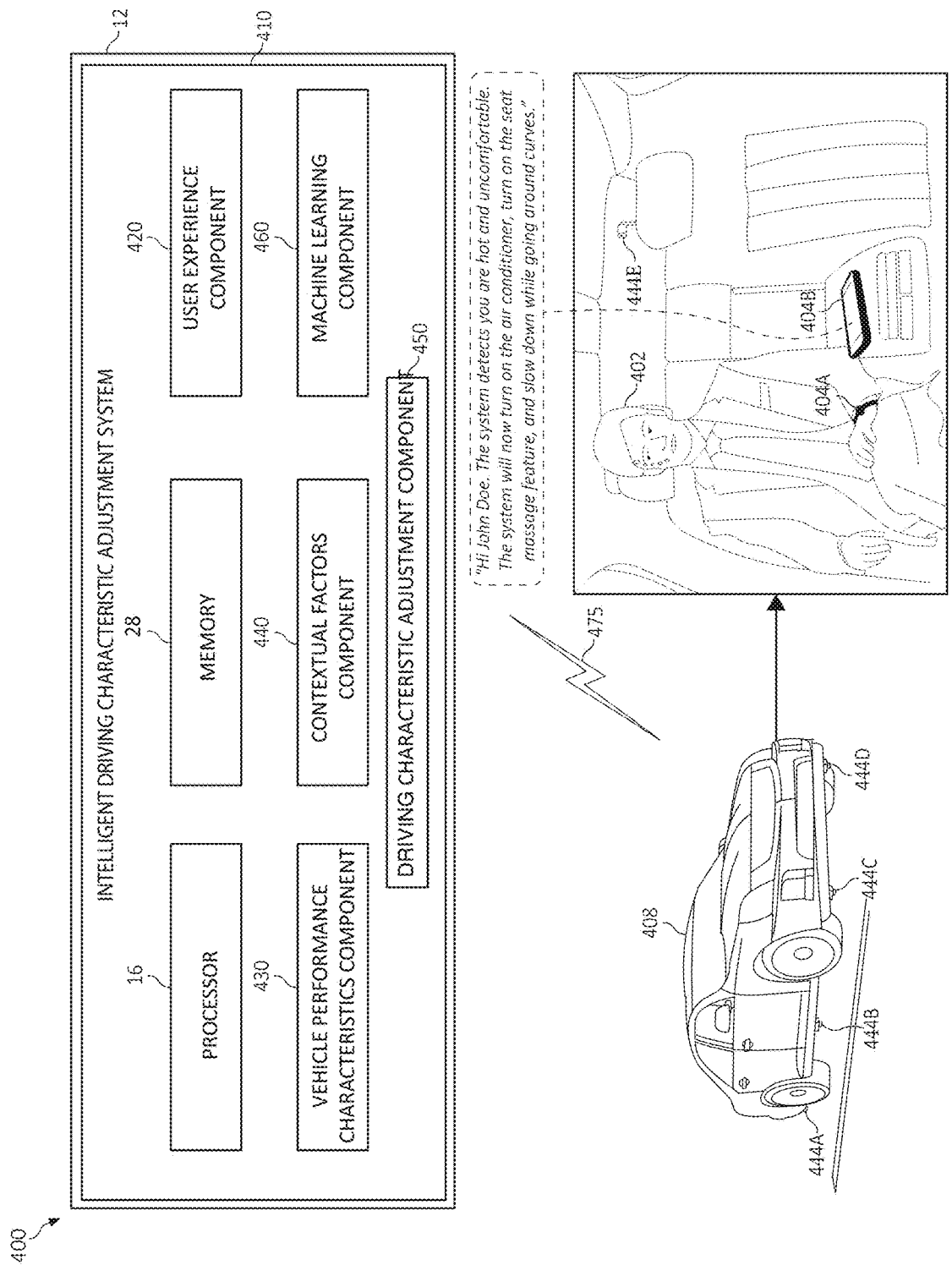
FIG. 4 is an additional block diagram depicting an exemplary functional relationship between various aspects of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4.

For example, computer system/server 12 of FIG. 1 may be included in FIG. 4 and may be connected to other computing nodes (such as computer systems of vehicles) over a distributed computing network, where additional data collection, processing, analytics, and other functionality may be realized. The computer system/server 12 of FIG. 1, may include an intelligent driving characteristic adjustment system 410. In one embodiment, the intelligent driving characteristic adjustment system 410 may be in communication via network or communication link 475 with one or more vehicles such as, for example, vehicle 408.

In one aspect, the intelligent driving characteristic adjustment system 410 may be an independent computing service provided by one or more computing systems and servers (e.g., a "HUB") for illustrative convenience but may be included in one or more components, modules, services, applications, and/or functions of FIGS. 1-3) and external to the vehicles 408. In an additional embodiment, the intelligent driving characteristic adjustment system 410 may be located and installed within one or more autonomous vehicles (e.g., an automobile and/or UAV) such as, for example, vehicle 408. Vehicle 408 may be associated with the intelligent driving characteristic adjustment system 410 via one or more pre-authorization operations and/or may be instantaneously joined to the intelligent driving characteristic adjustment system 410 via a series of authentication operations to join and grant permission to the intelligent driving characteristic adjustment system 410 to gain access to one or more IoT devices and/or computing systems of vehicles 408 for sharing the collaborative data.

Vehicle 408 may be driven by an occupant and/or by using self-driving technology (e.g., autopilot). Vehicle 408 may have installed thereon one or more internet of things (IoT) devices 444A-E, such as computing devices/sensor devices to gather data in relation to each of the occupants of the vehicle 408. That is, a variety of IoT devices 444A-E, such as cameras, sensor devices, audio input devices, recording devices, temperature sensors, atmospheric sensors, biological sensors, steering wheel sensors, gas pedal/brake sensors or other sensor devices to record or broadcast a wide variety of data) may be installed in and/or around the vehicle 408. In an additional aspect, the IoT devices 444A-E may be used collectively and/or individually to record, track, and/or monitor a user experience of a passenger.

Vehicle 408 may also receive data from one or more external sources and/or IoT devices such as, for example, a user equipment ("UE") 404A and/or UE 404B (e.g., cellular telephone 54A, desktop computer 54B, laptop computer 54C, and/or automobile computer system 54N of FIG. 2 or other IoT devices such as a smart watch). For example, UE 404A may be a smart watch and UE 404B may be a wireless communication device (e.g., a smart phone, tablet, etc.)

Also, the intelligent driving characteristic adjustment system 410 may incorporate processing unit 16 ("processor") and memory 28 of FIG. 1, for example, to perform various computational, data processing and other functionality in accordance with various aspects of the present invention. The intelligent driving characteristic adjustment system 410 may also include a user experience component 420, vehicle performance characteristics component 430, contextual factors component 440, and a driving characteristics adjustment component 450, each of which may be controlled and in communication with processing unit 16 and memory 28.

In one aspect, the user experience component 420 may determine a user experience satisfaction level during a journey within an autonomous vehicle according to current data and/or data measurements (e.g., biological data/measurements, temperature data, emotional state data/measurements, etc., of the user), historical user experience satisfaction levels, a user profile, one or more contextual factors, or a combination thereof. The user experience component 420 may collect user data relating to the historical user experience satisfaction levels, the user profile, and the one or more contextual factors. Moreover, the user experience component 420 may determine a current user experience satisfaction level from one or more sensors, internet of things (IoT) computing devices, one or more user equipment ("UE"), a global positioning satellite ("GPS") device, or a combination thereof.

That is, the user experience component 420, in association with one or more IoT devices 444A-D and/or UE's 404A, 404B may be used for detecting a physical state of a user (e.g., passenger of a vehicle). For example, one or more IoT computing devices or UEs such as, for example, UE 404A may measure biometric data (e.g., heart rate, blood pressure), UE 404A may detect hand tremors, and/or camera 444E may detect increased blinking. Moreover, IoT devices 444A-D and/or UE 404A, 404B may include wearable accelerometers and/or microphones for detecting hyperventilating, rapid breathing, detecting sounds, and/or detecting sweat and/or a change in passenger facial flushing state. In an additional aspect, the IoT devices 444A-D and/or UE 404A, 404B may also detect airsickness via odor and/or sound. The IoT devices 444A-D and/or UE 404A, may include detecting sounds and digital signal processing, nuclear localization signal ("NLS") indicating stress, comfort/discomfort words or negative emotion.

In one aspect, the user experience component 420, in association with one or more IoT devices 444A-D and/or UE's 404A, 404B may collect data (e.g., historical data), learn and/or maintain a profile of user preferences, and/or log of previous experiences. The user experience component 420 may also establish thresholds (e.g., stress thresholds/comfort level thresholds) of acceptability to a given user such as, for example, user 402.

The user experience component 420, in association with the machine learning component 460, may collect feedback from the user 402 during the journey. As such, the user experience 420 may monitor one or more activities, behavior, biometric data, or a combination thereof of the user via a reinforced feedback learning operation.

The vehicle performance characteristics component 430 may include a vehicle profile for each type of vehicle that indicates the various characteristics, capabilities, functionality, capacities, parameters, and/or modes/means of providing transportation.

The contextual factors component 440 may define the one or more identified contextual factors to include weather conditions, road conditions, autonomous vehicle manufacturer conditions, a level of traffic congestion within a selected distance from the vehicle, or other user defined contextual factors. The contextual factors component 440 may learn, identify, collect, analyze, evaluate, and/or determine each of the contextual factors positively and/or negatively affecting a satisfaction level of comfort of user 402.

The driving characteristics adjustment component 450, in association with the vehicle performance characteristics component 430, may adjust, alter, modify, transform, or change one or more vehicle performance characteristics/parameters (e.g., driving parameters/flying parameters) based on cognitive learning/understating of user history/user profile such as, for example, slowing down, reducing/lowering altitude, modifying gravitational forces ("G-forces") experienced by adjusting or creating maneuvers more gradual, and/or decreasing a speed.

The driving characteristics adjustment component 450, in association with the vehicle performance characteristics component 430, may adjust, alter, modify, transform, or change one or more user/passenger comfort parameters based on cognitive learning/understating of user history/user profile such as, for example, heating/cooling air temperature, making windows opaque, displaying a stable horizon on a large monitor in front of vehicle/UAV (e.g., drone), adding more oxygen to an air mixture, adjusting an aroma and/or fragrance to the user 402 for a calming experience, playing a calming sound unique to the user, displaying an interactive user interface on seat monitor to distract a passenger, shift a light to a red spectrum, and/or activating a massage mechanism associated with a vehicle/UAV (e.g., a robotic massage).

The driving characteristics adjustment component 450, in association with the vehicle performance characteristics component 430, may adjust one or more performance characteristics of an autonomous vehicle if a user experience satisfaction level is less than a predetermined threshold. The driving characteristics adjustment component 450 may adjust, alter, transform, and/or change a type of autonomous vehicle or mode of transport of the autonomous vehicle.

The machine learning component 460 may learn the one or more contextual factors, the user profiles, reinforced feedback learning, the user experience satisfaction level, or a combination thereof.

The machine learning component 460, in association with the user experience component 420, may use dynamic implicit feedback based on user's 402 cognitive heuristics in order to reconfigure the driving/travel characteristics (e.g., riding, driving, flying, etc.) and user comfort parameters upon reaching a comfort/stress threshold, which may be user defined per travel characteristics such as, for example, a range of values, a single value, and/or percentage above an appropriate (e.g., normal) user maximal acceptable driving/travel characteristics as indicated from a user profile and/or previous amalgamated user experiences.

In one aspect, the driving characteristics adjustment component 450 may continuously (e.g., "ongoing") affect, adjust, modify, alter, and/or change the ravel characteristic adjustment until the travel characteristic is equal to and/or below the defined threshold (e.g., comfort/stress threshold) and/or any other additional recovery threshold such as, for example, a stress threshold may be acceptable at 20% of normal and recovery threshold may be above 10%). In one aspect, dual thresholds may be used and allow for a user (e.g., user 402) to learn to be comfortable with more extreme travel characteristics.

In one aspect, the machine learning component 460, in association with the user experience component 420, may collect explicit feedback that is based on manual control of preferences, which may be pre-set by a user/passenger (e.g., user 402) or may be explicitly modified, adjusted, altered, changed, or updated in real time based on the user preferences (e.g., initial user preferences set based on a user/passenger profile).

The machine learning component 460 may assist with learning a cognitive state (e.g., a dynamic cognitive state) of the user and may be re-configured automatically in real-time by modifying one or more applied weights (e.g., weighted value) applied in a multi-level neural networks system and understanding each of the effects of physical state of the passenger.

Thus, using the various components of FIG. 4, the vehicle 408, using one or more communication mechanisms of the vehicle 408, may audibly state "Hi John Doe. The system detects you are hot and uncomfortable. The system will now turn on the on the air conditioner, turn on the seat massage feature, and slow down while going around curves."

In one aspect, the machine learning component 460, as described herein, may be performed by a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

With the foregoing functional components 400 in view, the present invention may provide a cognitive system that provides for passenger comfort within an autonomous vehicle. User data may be from previous user experiences and/or defined user profile. Vehicle performance characteristics may be affected based on the collected user data. A user's travel experience (e.g., a satisfaction level of comfort) may be dynamically measured/determined and compared to one or more thresholds. A vehicle performance characteristics may be adjusted to improve the user experience.

In one aspect, the user experience may be collected, recorded, and/or received from on-board sensors and/or other user an amalgamation of experiences from other vehicles. The present invention may continuously execute a loop monitoring user's behavior via reinforcement feedback learning mechanism and provide an audio, visual, and/or biometric feedback analysis.

Figure 5:
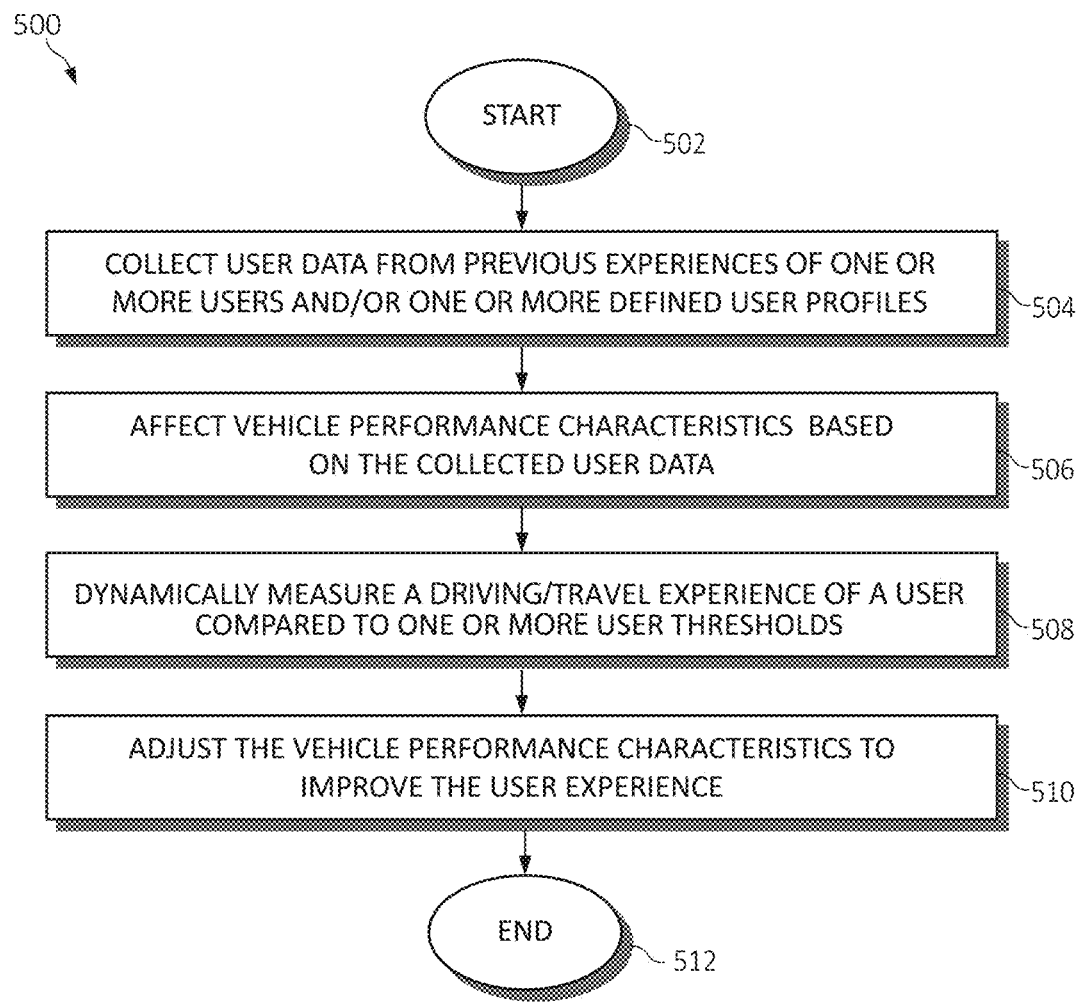
FIG. 5 is a flowchart diagram of an exemplary method for implementing intelligent driving characteristic adjustment for autonomous vehicles of a vehicle by a processor, in which various aspects of the present invention may be realized.

Turning now to FIG. 5, a method 500 for implementing intelligent driving characteristic adjustment for autonomous vehicles by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502.

User data may be collected from previous experiences of one or more users and/or one or more defined user profiles, as in block 504. Vehicle performance characteristics may be affected based on the collected user data, as in block 506. A driving/travel experience of a user (e.g., a current experience of the user) may be dynamically measured and may be compared to one or more user thresholds, as in block 508. The vehicle performance characteristics may be adjusted to improve the user experience, as in block 510. The functionality 500 may end, as in block 512.

Figure 6:
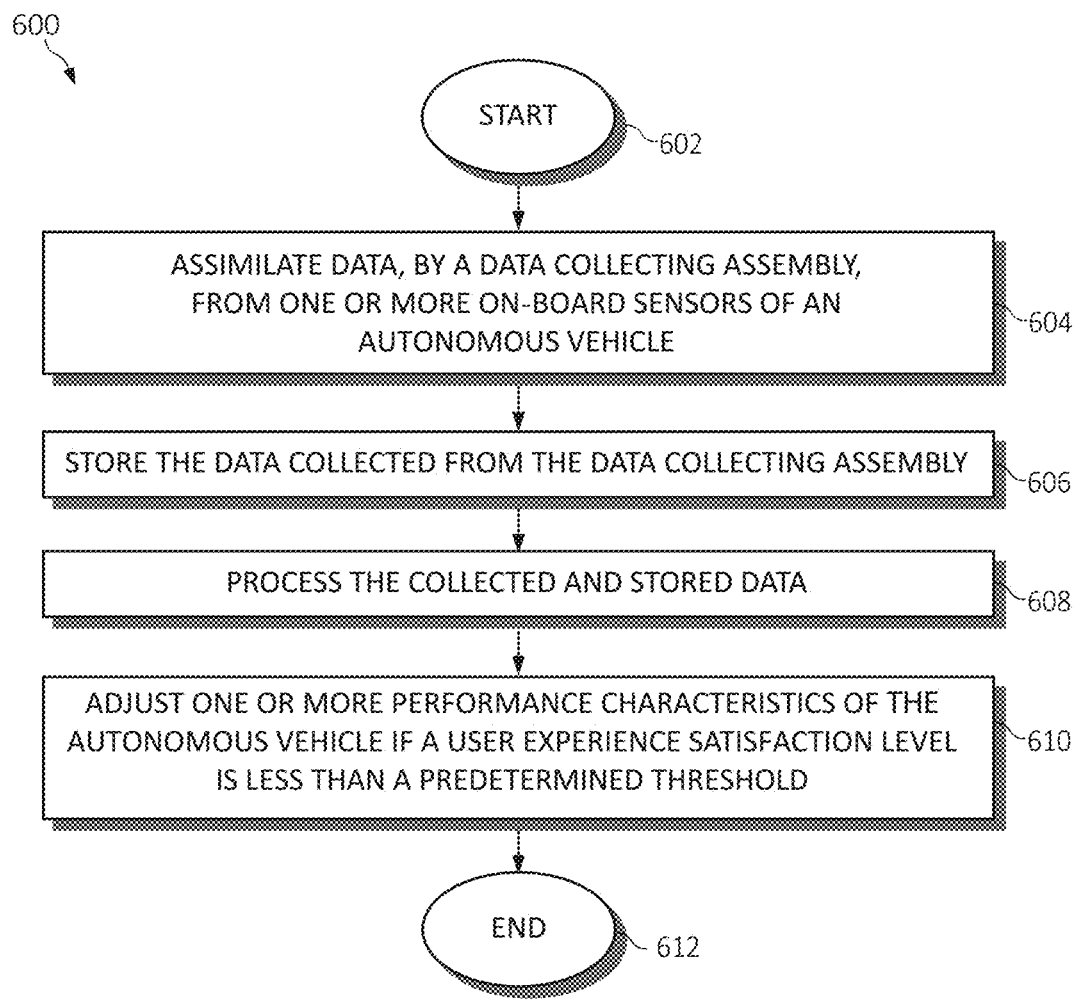
FIG. 6 is a flowchart diagram of an exemplary method for providing passenger comfort within an autonomous aerial vehicle by a processor, in which various aspects of the present invention may be realized

Turning now to FIG. 6, a method 600 for providing passenger comfort within an autonomous aerial vehicle by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

A data collecting assembly may assimilate data from one or more on-board sensors of an autonomous vehicle, as in block 604. The data collected from the data collecting assembly may be stored, as in block 606. The collected and stored data may be processed, as in block 608. One or more parameters of a user's experience may be adjusted to a selected, defined, and/or optimal comfort level (e.g., a level of satisfaction), as in block 610. The functionality 600 may end, as in block 612.

Figure 7:
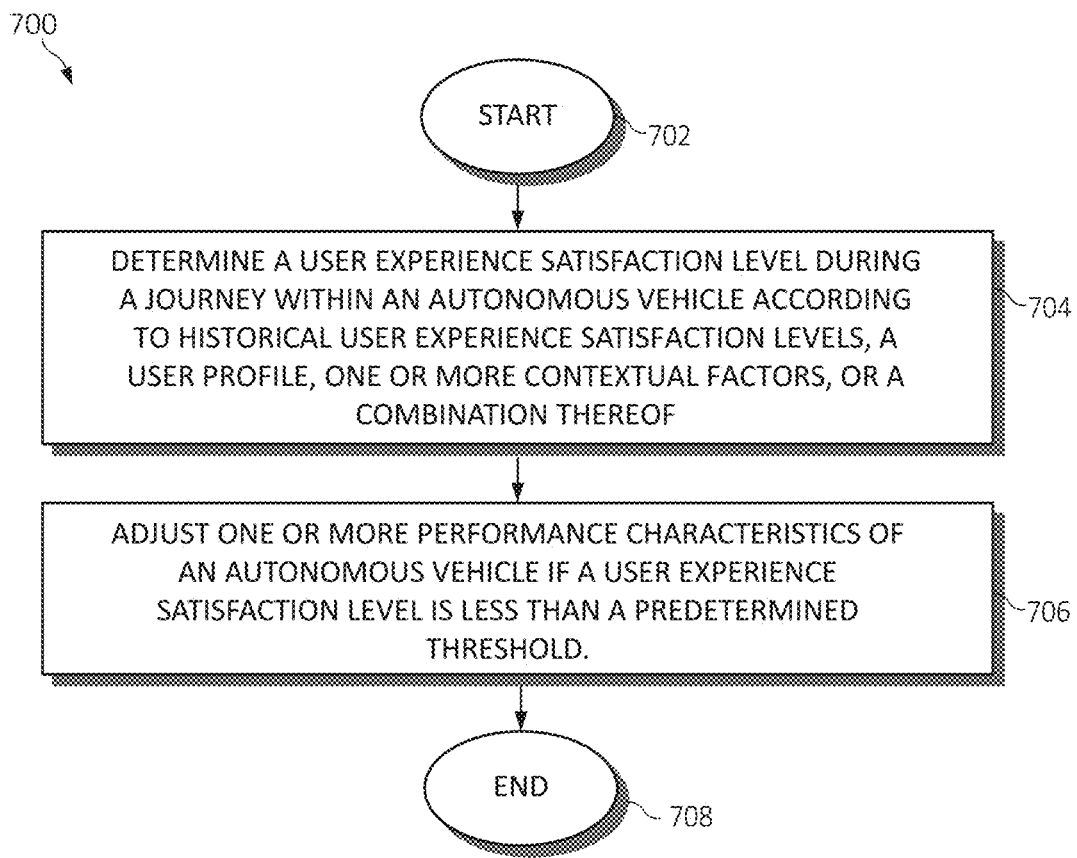
FIG. 7 is a flowchart diagram of an exemplary method for implementing intelligent driving characteristic adjustment for autonomous vehicles by a processor, in which various aspects of the present invention may be realized.

Turning now to FIG. 7, a method 700 for implementing intelligent driving characteristic adjustment for autonomous vehicles by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

A user experience satisfaction level during a journey within an autonomous vehicle according to historical user experience satisfaction levels, a user profile which may include real-time acquired and/or detecting various user information such as, for example, one or more contextual factors, or a combination thereof, as in block 704. One or more performance characteristics of an autonomous vehicle may be adjusted if a user experience satisfaction level is less than a predetermined threshold, as in block 706. It should be noted that the user experience satisfaction level may also be an average value of a different user experience satisfaction levels from a cluster of user profiles learned over a selected period of time. The functionality 700 may end, as in block 708.

In one aspect, in conjunction with and/or as part of at least one block of FIGS. 5-7, the operations of methods 500, 600, and/or 700 may include each of the following. The operations of methods 500, 600, and/or 700 may determine a level of compliance with the driver performance requirements by the one or more entities.

The operations of methods 500, 600, and/or 700 may collect user data relating to the historical user experience satisfaction levels, the user profile, and the one or more contextual factors, cluster the historical user experience satisfaction levels, the one or more user profiles, one or more contextual factors, or a combination thereof into a cluster of users for the one or more users, and determine a risk threshold for the cluster of users and use reinforcement learning to dynamically adjust the parameters based on a global satisfaction level of the cluster of users. A type of autonomous vehicle or mode of transport of the autonomous vehicle may be changed, adjusted, altered, and/or transformed The operations of methods 500, 600, and/or 700 may determine the user experience satisfaction level from one or more sensors, internet of things (IoT) computing devices, one or more UE's, a GPS device, or a combination thereof. One or more activities, behavior, biometric data, or a combination thereof of the user may be monitored via a reinforced feedback learning operation. The operations of methods 500, 600, and/or 700 may further collect feedback (e.g., audio feedback, video feedback, etc.) from the user in the autonomous vehicle during the journey.

The operations of methods 500 and/or 600 may initiate a machine learning mechanism to learn the one or more identified contextual factors, the user profiles, reinforced feedback learning, the user experience satisfaction level, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for implementing intelligent driving characteristic adjustment for autonomous vehicles, comprising:
   determining a user experience satisfaction level for one or more users during a journey within an autonomous vehicle according to historical user experience satisfaction levels, one or more user profiles, one or more contextual factors, or a combination thereof; and
   dynamically adjusting one or more performance characteristics of the autonomous vehicle for the one or more users according to the historical user experience satisfaction levels, the one or more user profiles, one or more contextual factors, or a combination thereof, if the user experience satisfaction level is less than a predetermined threshold, wherein during the dynamic adjustment, the one or more performance characteristics are continuously adjusted to bring the user experience satisfaction level above the predetermined threshold by maintaining the one or more performance characteristics substantially below a stress threshold comprised of a first percentage above a value indicative of previous amalgamated user experiences represented by the one or more user profiles, notwithstanding the one or more performance characteristics are allowed to exceed the stress threshold to a recovery threshold, comprised of a second percentage, as the dynamic adjustment is performed, and wherein the stress threshold and the recovery threshold are implemented as dual thresholds for a particular characteristic of the one or more performance characteristics allowed to exceed the stress threshold to introduce the one or more users into becoming comfortable with the particular characteristic as the one or more users travel in the autonomous vehicle.

2. The method of claim 1, further including:
   collecting user data relating to the historical user experience satisfaction levels, the one or more user profiles, one or more contextual factors, or a combination thereof;
   clustering the historical user experience satisfaction levels, the one or more user profiles, one or more contextual factors, or a combination thereof into a cluster of users for the one or more users; and
   determining a risk threshold for the cluster of users and use reinforcement learning to dynamically adjust the one or more performance characteristics based on a global satisfaction level of the cluster of users.

3. The method of claim 1, further including changing a type of autonomous vehicle or mode of transport of the autonomous vehicle.

4. The method of claim 1, further including determining the user experience satisfaction level from one or more sensors, internet of things (IoT) computing devices, one or more user equipment ("UE"), a global positioning satellite ("GPS") device, or a combination thereof.

5. The method of claim 1, further including monitoring one or more activities, behavior, biometric data, or a combination thereof of the user via a reinforced feedback learning operation.

6. The method of claim 1, further including collecting feedback from the user during the journey.

7. The method of claim 1, further including implementing a machine learning mechanism to learn the one or more contextual factors, the user profiles, reinforced feedback learning, the user experience satisfaction level, or a combination thereof.

8. A system for implementing intelligent driving characteristic adjustment for autonomous vehicles, comprising:
   one or more computers with executable instructions that when executed cause the system to:
   determine a user experience satisfaction level during a journey within an autonomous vehicle according to historical user experience satisfaction levels, a user profile, one or more contextual factors, or a combination thereof; and
   dynamically adjust one or more performance characteristics of the autonomous vehicle for the one or more users according to the historical user experience satisfaction levels, the one or more user profiles, one or more contextual factors, or a combination thereof, if the user experience satisfaction level is less than a predetermined threshold, wherein during the dynamic adjustment, the one or more performance characteristics are continuously adjusted to bring the user experience satisfaction level above the predetermined threshold by maintaining the one or more performance characteristics substantially below a stress threshold comprised of a first percentage above a value indicative of previous amalgamated user experiences represented by the one or more user profiles, notwithstanding the one or more performance characteristics are allowed to exceed the stress threshold to a recovery threshold, comprised of a second percentage, as the dynamic adjustment is performed, and wherein the stress threshold and the recovery threshold are implemented as dual thresholds for a particular characteristic of the one or more performance characteristics allowed to exceed the stress threshold to introduce the one or more users into becoming comfortable with the particular characteristic as the one or more users travel in the autonomous vehicle.

9. The system of claim 8, wherein the executable instructions further:
collect user data relating to the historical user experience satisfaction levels, the user profile, and the one or more contextual factors;
cluster the historical user experience satisfaction levels, the one or more user profiles, one or more contextual factors, or a combination thereof into a cluster of users for the one or more users; and
determine a risk threshold for the cluster of users and use reinforcement learning to dynamically adjust the one or more performance characteristics based on a global satisfaction level of the cluster of users.

10. The system of claim 8, wherein the executable instructions further change a type of autonomous vehicle or mode of transport of the autonomous vehicle.

11. The system of claim 8, wherein the executable instructions further determine the user experience satisfaction level from one or more sensors, internet of things (IoT) computing devices, one or more user equipment ("UE"), a global positioning satellite ("GPS") device, or a combination thereof.

12. The system of claim 8, wherein the executable instructions further monitor one or more activities, behavior, biometric data, or a combination thereof of the user via a reinforced feedback learning operation.

13. The system of claim 8, wherein the executable instructions further collect feedback from the user during the journey.

14. The system of claim 8, wherein the executable instructions further implement a machine learning mechanism to learn the one or more contextual factors, the user profiles, reinforced feedback learning, the user experience satisfaction level, or a combination thereof.

15. A computer program product for implementing intelligent driving characteristic adjustment for autonomous vehicles by a processor, the computer program product comprising a non-transitory computer-readable storage medium having computer-readable program code portions stored therein, the computer-readable program code portions comprising:
an executable portion that determines a user experience satisfaction level during a journey within an autonomous vehicle according to historical user experience satisfaction levels, a user profile, one or more contextual factors, or a combination thereof; and
an executable portion that dynamically adjusts one or more performance characteristics of the autonomous vehicle for the one or more users according to the historical user experience satisfaction levels, the one or more user profiles, one or more contextual factors, or a combination thereof, if the user experience satisfaction level is less than a predetermined threshold, wherein during the dynamic adjustment, the one or more performance characteristics are continuously adjusted to bring the user experience satisfaction level above the predetermined threshold by maintaining the one or more performance characteristics substantially below a stress threshold comprised of a first percentage above a value indicative of previous amalgamated user experiences represented by the one or more user profiles, notwithstanding the one or more performance characteristics are allowed to exceed the stress threshold to a recovery threshold, comprised of a second percentage, as the dynamic adjustment is performed, and wherein the stress threshold and the recovery threshold are implemented as dual thresholds for a particular characteristic of the one or more performance characteristics allowed to exceed the stress threshold to introduce the one or more users into becoming comfortable with the particular characteristic as the one or more users travel in the autonomous vehicle.

16. The computer program product of claim 15, further including an executable portion that:
collects user data relating to the historical user experience satisfaction levels, the user profile, and the one or more contextual factors;
clusters the historical user experience satisfaction levels, the one or more user profiles, one or more contextual factors, or a combination thereof into a cluster of users for the one or more users; and
determines a risk threshold for the cluster of users and use reinforcement learning to dynamically adjust the one or more performance characteristics based on a global satisfaction level of the cluster of users.

17. The computer program product of claim 15, further including an executable portion that changes a type of autonomous vehicle or mode of transport of the autonomous vehicle.

18. The computer program product of claim 15, further including an executable portion that determines the user experience satisfaction level from one or more sensors, internet of things (IoT) computing devices, one or more user equipment ("UE"), a global positioning satellite ("GPS") device, or a combination thereof.

19. The computer program product of claim 15, further including an executable portion that:
monitors one or more activities, behavior, biometric data, or a combination thereof of the user via a reinforced feedback learning operation; and
collect feedback from the user during the journey.

20. The computer program product of claim 15, further including an executable portion that implements a machine learning mechanism to learn the one or more contextual factors, the user profiles, reinforced feedback learning, the user experience satisfaction level, or a combination thereof.

* * * * *